(12) United States Patent
Kim et al.

(10) Patent No.: US 9,684,358 B2
(45) Date of Patent: Jun. 20, 2017

(54) ELECTRICAL APPLIANCE

(71) Applicant: LG ELECTRONICS INC., Seoul (KR)

(72) Inventors: Yanghwan Kim, Changwon-si (KR); Daejong Kang, Changwon-si (KR); Changhan Ahn, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 868 days.

(21) Appl. No.: 14/018,918

(22) Filed: Sep. 5, 2013

(65) Prior Publication Data
US 2014/0074310 A1    Mar. 13, 2014

(30) Foreign Application Priority Data

Sep. 7, 2012   (KR) .................. 10-2012-0099366
Sep. 7, 2012   (KR) .................. 10-2012-0099386
Sep. 7, 2012   (KR) .................. 10-2012-0099393

(51) Int. Cl.
    *G06F 1/32*       (2006.01)
    *F25D 29/00*      (2006.01)

(52) U.S. Cl.
    CPC .......... *G06F 1/3234* (2013.01); *F25D 29/00* (2013.01); *F25D 2400/361* (2013.01)

(58) Field of Classification Search
    CPC ... G06F 1/3234; F25D 29/00; F25D 2400/361
    USPC ...................................................... 700/297
    See application file for complete search history.

(56) References Cited

U.S. PATENT DOCUMENTS

| 4,373,351 A * | 2/1983 | Stamp, Jr. ........... F24D 19/1039 165/268 |
| 2004/0133314 A1* | 7/2004 | Ehlers ................. F24F 11/0012 700/276 |
| 2007/0239317 A1* | 10/2007 | Bogolea ............... B60H 1/0065 700/276 |
| 2010/0211233 A1* | 8/2010 | Roscoe .................... H02J 3/008 700/296 |
| 2011/0046806 A1* | 2/2011 | Nagel .................. H04L 67/125 700/291 |

(Continued)

FOREIGN PATENT DOCUMENTS

| CN | 1746798 A | 3/2006 |
| CN | 101025370 A | 8/2007 |

(Continued)

*Primary Examiner* — Jason Lin
(74) *Attorney, Agent, or Firm* — Dentons US LLP

(57) ABSTRACT

An electrical appliance includes a communication unit receiving energy related information from the outside; a control unit receiving the energy related information from the communication unit; an energy consumption component operating by the control unit; and an input unit receiving a command for selecting an operation mode of the energy consumption component. The operation mode of the energy consumption component includes a first power saving mode in which the operation of the energy consumption component is restricted on a basis of the energy related information, and a second power saving mode in which the operation of the energy consumption component is restricted irrespective of the energy related information. One of the first and second power saving modes is selected through the input unit.

12 Claims, 14 Drawing Sheets

(56) References Cited

U.S. PATENT DOCUMENTS

| | | | | |
|---|---|---|---|---|
| 2011/0196547 A1* | 8/2011 | Park | ................. | G06Q 50/06 |
| | | | | 700/296 |
| 2011/0251731 A1* | 10/2011 | Yang | ................. | H02J 3/14 |
| | | | | 700/296 |
| 2012/0296489 A1* | 11/2012 | Lee | ................. | H02J 3/008 |
| | | | | 700/297 |
| 2013/0245851 A1* | 9/2013 | Ahn | ................. | G06Q 10/06 |
| | | | | 700/295 |

FOREIGN PATENT DOCUMENTS

| | | | | |
|---|---|---|---|---|
| CN | 101853017 A | 10/2010 | | |
| JP | 2004-206216 A | 7/2004 | | |
| KR | WO 2011064671 A2 * | 6/2011 | ............. | H02J 3/008 |

\* cited by examiner (a)

(b)

ELECTRICAL APPLIANCE

CROSS-REFERENCE TO RELATED APPLICATIONS

The present application claims priority under 35 U.S.C. 119 and 35 U.S.C. 365 to Korean Patent Application No. 10-2012-0099386 (filed on Sep. 7, 2012), Korean Patent Application No. 10-2012-0099393 (filed on Sep. 7, 2012), and Korean Patent Application No. 10-2012-0099366 (filed on Sep. 7, 2012), which are hereby incorporated by reference in its entirety.

BACKGROUND

The present disclosure relates to an electrical appliance.

Suppliers simply have supplied energy sources such as electricity, water, and gas, and consumers simply have used the supplied energy sources. Thus, it was difficult to perform effective management in terms of energy production, distribution, or usage.

That is, energy has a radial structure in which the energy is distributed from an energy supplier to a plurality of consumers or spread from a central part to a peripheral part, and has a supplier-directed characteristic, not a consumer-directed characteristic.

It is not possible to know information on electricity price in real time but only in a limited way through power exchange. There is also a drawback in that it is not possible to use an inducement such as incentive for a consumer through a change in price because a price system is actually a fixed price system.

In order to solve this problem, many efforts for implementing horizontal, cooperative, and distributed networks that effectively manage energy and enable the interaction between a consumer and a supplier have been made recently.

Typical electrical appliances have been configured so that they operate in a time zone that is inputted by a user and in an operation mode that is inputted by the user. Thus, if a power consumer operates the electrical appliances in a time zone when much power is used, there is a drawback in that there is a problem with power supply or blackout occurs because consumption power is greater than power supplied from the power supplier.

SUMMARY

Embodiments provide an electrical appliance.

In one embodiment, an electrical appliance includes a communication unit receiving energy related information from the outside; a control unit receiving the energy related information from the communication unit; an energy consumption component operating by the control unit; and an input unit receiving a command for selecting an operation mode of the energy consumption component, and wherein the operation mode of the energy consumption component includes: a first power saving mode in which the operation of the energy consumption component is restricted on a basis of the energy related information, and a second power saving mode in which the operation of the energy consumption component is restricted irrespective of the energy related information, and one of the first and second power saving modes is selected through the input unit.

In another embodiment, an electrical appliance includes a communication unit receiving energy related information from the outside; a control unit receiving the energy related information from the communication unit; and an energy consumption component operating by the control unit; and wherein the energy related information includes a restriction time period, the control unit selects one of a delay appliance load mode and a temporary appliance load reduction mode on a basis of a length of the restriction time period, and the control unit restricts an operation of the energy consumption component to a mode selected in the restriction time period.

In further another embodiment, an electrical appliance includes a communication unit receiving energy related information from the outside; an input unit receiving a command to select an operation mode; a control unit receiving information from the input unit or the communication unit; and a compressor and a heater operating by the control unit, and wherein the control unit determines whether a power saving mode becomes on and there is a need for a defrosting operation, and the control unit restricts the defrosting operation in the restriction time period if the restriction time period starts while the power saving mode becomes on and the defrosting operation is performed.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
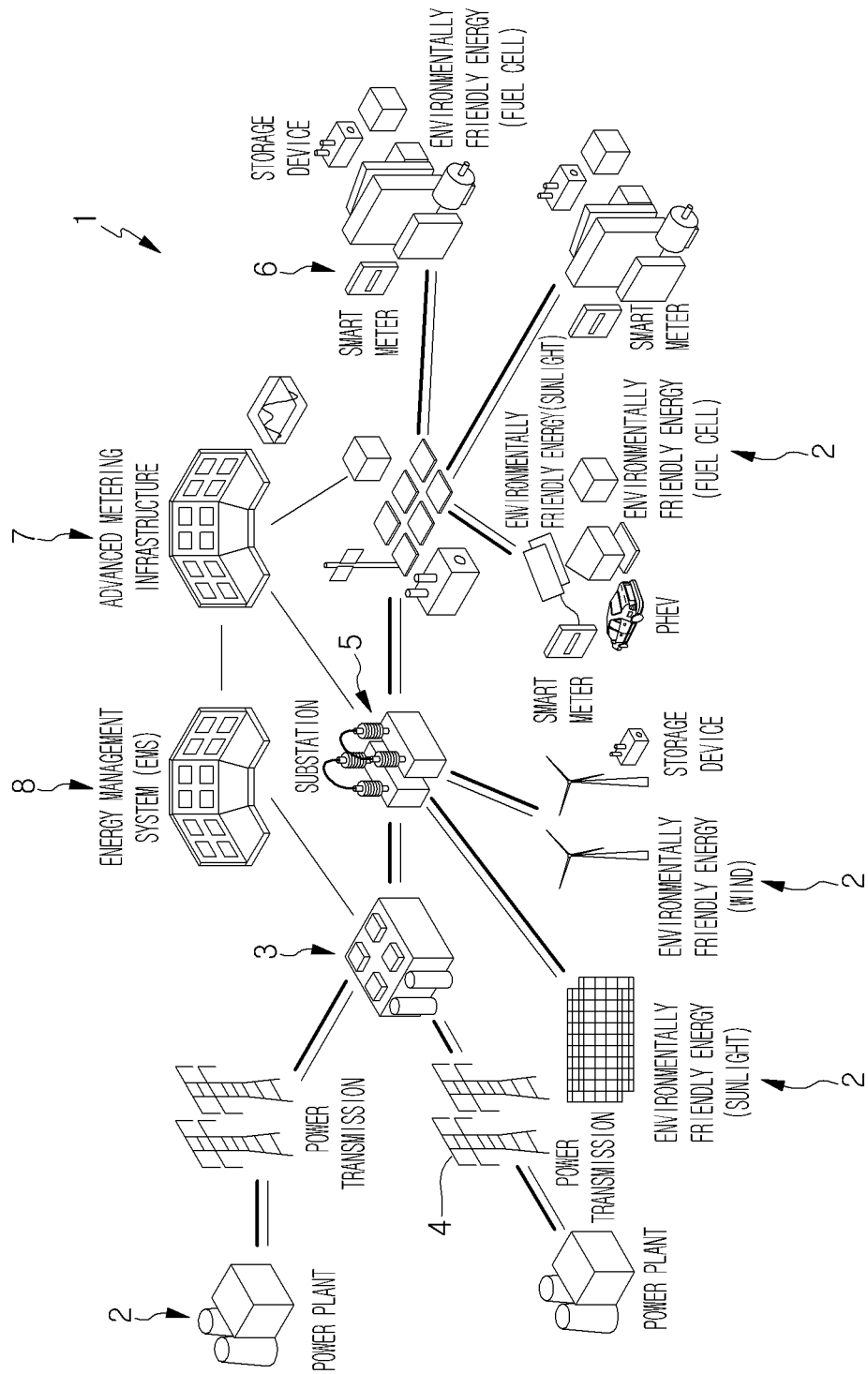
FIG. 1 is a schematic diagram of a network system according to an embodiment.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system 1 according to an embodiment includes a power plant 2 for producing electricity. The power plant 2 may include a power plant for producing electricity through a thermal power generation or nuclear power generation and a power plant using water power, sunlight power, wind power or the like which is eco-friendly energy.

The electricity produced in the power plant is transmitted to a sub-control center 3 through a power transmission line 4, and the sub-control center 3 transmits the electricity to a substation 5 so that the electricity is distributed to customers such as houses or offices.

Electricity produced by the eco-friendly energy is also transmitted to the substation 5 so as to be distributed to each of the customers. The electricity transmitted from the substation 5 is distributed to each of the offices or houses through electricity power storage, or is directly distributed to each of the offices or houses.

In a house using a home area network (HAN), electricity may be produced by the house through sunlight, fuel cells built in a plug-in hybrid electric vehicle (PHEV), or the like. Also, the produced electricity may be stored or distributed, or surplus electricity may be resold to the outside world.

The network system may include a smart meter 6 for detecting the amount of electricity used in each customer (house, office or the like) in real time, and an advanced metering infrastructure (AMI) 7 for metering the amount of electricity used in a plurality of customers.

That is, the AMI 7 may receive information metered from a plurality of smart meters 6 and meter electricity consumption.

In the specification, metering includes metering carried out by the smart meters and the AMI, and recognizing by the smart meters and the AMI after receiving yield or a consumption amount from another component.

The network system 1 may further include an energy management system (EMS) 8 for managing energy. The EMS 8 may generate information on operations of one or more components with respect to energy (production of energy, distribution of energy, usage of energy, storage of energy, and the like). The EMS 8 may generate at least a command for the operations of the components.

In this specification, a function or solution performed by the EMS 8 may be referred to as an energy management function or energy management solution.

In the network system 1, one or more EMSs 8 may be provided as a separate configuration, or the EMS 8 may be included as an energy management function or energy management solution in one or more components.

Figure 2:
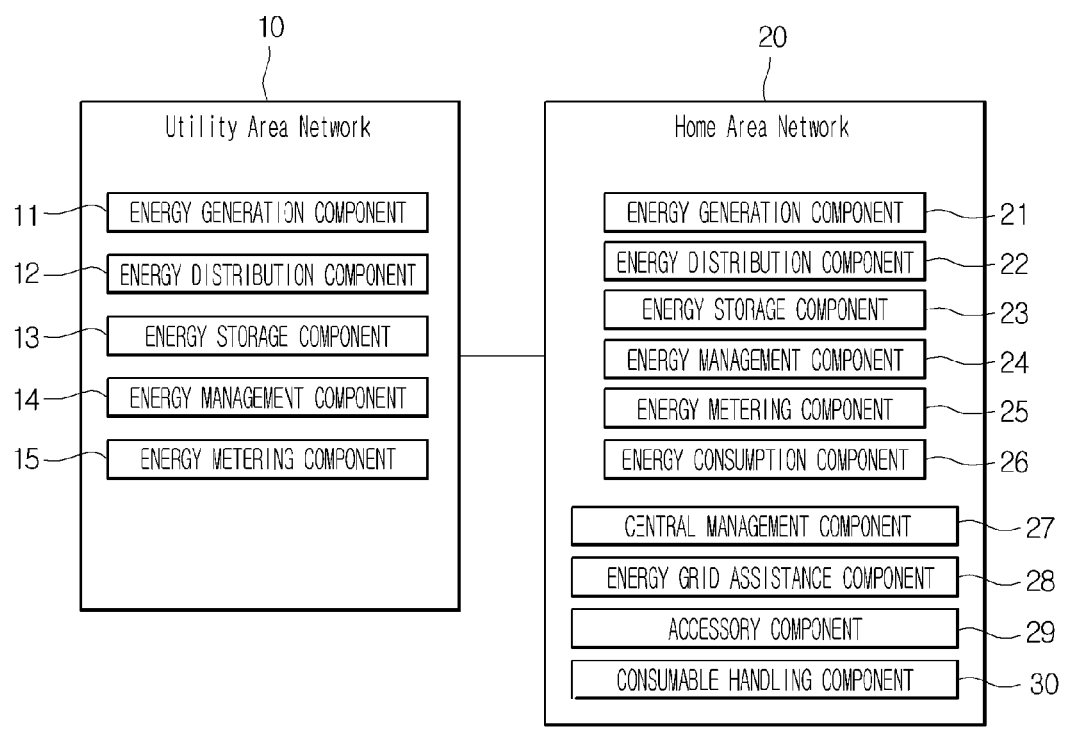
FIG. 2 is a schematic block diagram of a network system according to an embodiment.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication. In this case, the UAN 10 and the HAN may communicate with each other directly or through an external server.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 through a terminal component (not shown). The terminal component may be a gate way as an example. The terminal component may be provided to one or more of the UAN 10 and the HAN 20.

On the other hand, the HAN 20 may include some or all of an energy generation component 21 that generates energy, an energy distribution component 22 that distributes energy, an energy storage component 23 that stores energy, an energy management component 24 that manages energy, an energy metering component 25 that measures energy related information, an energy consumption component 26 that consumes energy, a central management component 27 that controls a plurality of components, an energy grid assistance component 28, an accessory component 29, and a consumable handling component 30.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy metering component 25 may meter information related to the generation of energy, the distribution of energy, the usage of energy, the storage of energy, and the like. The energy metering component 25 may be a smart meter as an example.

The energy consumption component 26 may be, as an example, a heater, a motor, a display, and etc. that configures an electrical appliance (refrigerator, washing machine, air conditioner, cooking device, cleaner, dryer, dishwasher, dehumidifier, display device, lighting equipment, and etc.). In the present embodiment, there is no limitation on the type of the energy consumption component 26.

The energy management component 24 may be an individual component or included as an energy management function in another component. The energy management component 24 may transmit and receive information in communication with one or more components. The energy generation component 21, the energy distribution component 22 and the energy storage component 23 may be individual components, or may constitute a single component. The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

The accessory component 29 is an energy network dedicated component that plays an additional function for the energy grid. For example, the accessory component 29 may be an energy network dedicated weather reception antenna.

The consumable handing component 30 is a component that stores, supplies, and delivers consumables, and may check or recognize information on the consumables. The consumables may be articles or materials that are used or processed when operating the energy consumption component 26, for example. In addition, the consumable handling component 30 may be managed by, for example, the energy management component 24 on the energy grid.

For example, the consumable may be laundry for a washing machine, food for a cooking device, detergent or softener used for washing laundry in the washing machine, or seasoning for cooking food, and etc.

The energy generation components 11 and 21, the energy distribution components 12 and 22, the energy storage components 13 and 23, the energy management components 14 and 24, the energy metering components 15 and 25, the energy consumption component and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

Moreover, the component having a specific function that configures the utility area network and the HAN may be in plural. For example, the energy generation component or the energy consumption component may be in plural.

On the other hand, the utility area network 10 may communicate with the HAN 20 by using a communication means (first interface). In this case, a plurality of utility area networks 10 may communicate with a single HAN 20 and a single utility area network 10 may communicate with a plurality of HANs 20.

As an example, the communication unit may be a simple communication line or a power line communication means. Of course, the power line communication means may include communication equipment (as an example, a modem) that is connected to two components. As another example, the communication means may be zigbee, wi-fi, bluetooth, NFC, and etc. In the specification, there is no limitation on a wired communication method or on a wireless communication method.

Two components that configure the utility area network 10 may communicate by using a communication means. Moreover, two components that configure the HAN 20 may communicate by using a communication means (a second interface). As an example, the energy consumption component 26 may communicate with one or more of the energy management component 24, the energy metering component 25, the central management component 27, and the energy grid assisting component 28 by using a communication means (a second interface).

In addition, the microcomputer of each component (for example, the energy consumption component) may communicate with the communication means (second interface) by using a communication means (third interface). For example, in a case where the energy consumption component is an electrical appliance, the energy consumption component may receive information from the energy management component by using the communication means (second interface), and the received information may be transmitted to the microcomputer of the electrical appliance by using the third interface.

Moreover, the energy consumption component 26 may communicate with the accessory component 29 by using a communication means (fourth interface). Moreover, the energy consumption component 26 may communicate with the consumable handling component 30 by using a communication means (fifth interface).

Figure 3:
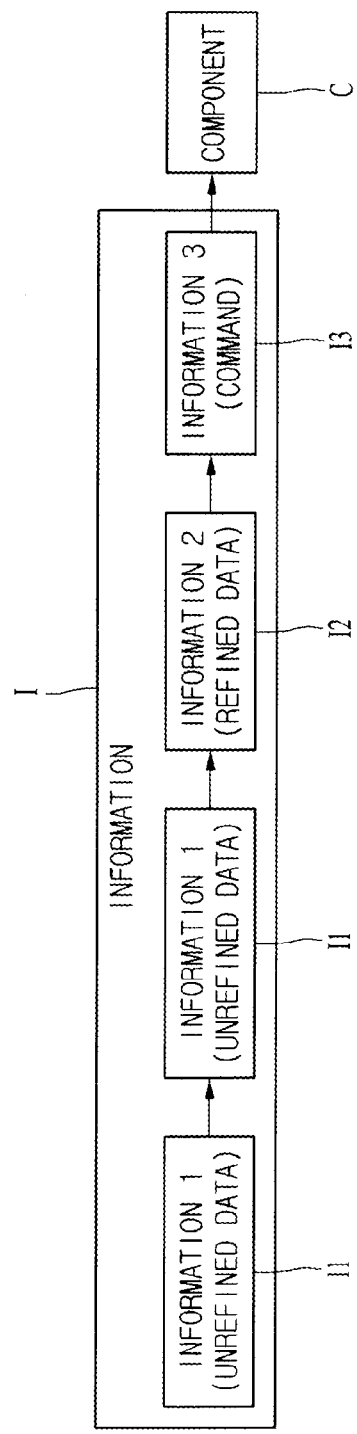
FIG. 3 is a block diagram of an information delivery process on a network system of an embodiment.
Figure 4:
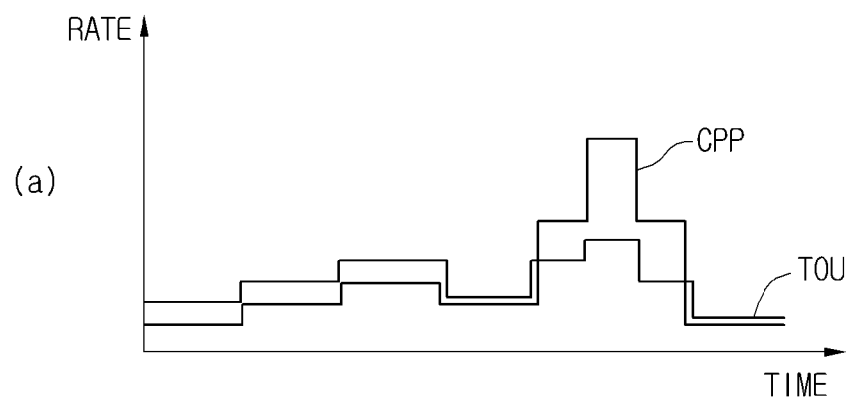
FIGS. 4(a) and 4(b) are graphs for explaining a fluctuation pattern of electric rate.
Figure 4:
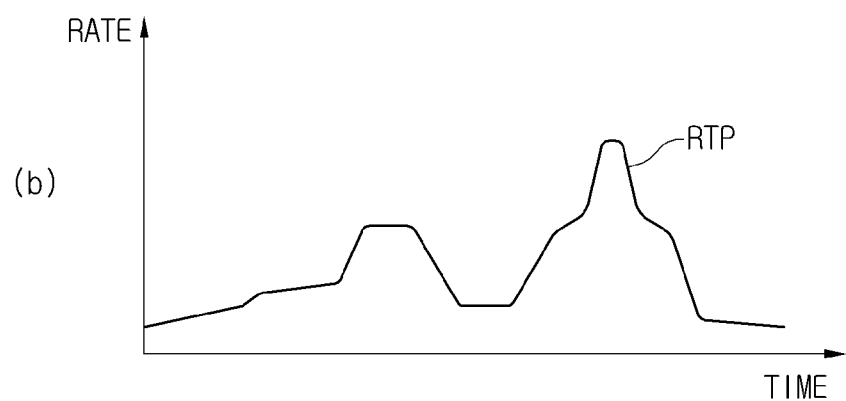

FIG. 3 is a block diagram of an information delivery process on a network system of an embodiment. FIGS. 4(a) and 4(b) are graphs for explaining a fluctuation pattern of electric rate. In particular, FIG. 4(a) is a graph of information on time of use (TOU) and information on a critical peak pattern (CPP), and FIG. 4(b) is a graph of information on a real time pattern (RTP).

Referring to FIG. 3, a specific component C may receive energy related information (hereinafter, referred to as "energy information") by using a communication means in a network system of an embodiment. In addition to energy information, the specific component C may further receive additional information (environmental information, program update information, time information, information on each component's operation or state (failure) and information on the habit of a user who uses the energy consumption component) by using a communication means.

The environmental information may include carbon dioxide ($CO_2$) emissions, the atmospheric concentration of $CO_2$, temperatures, humidity, rainfalls, information on whether it will rain, and the amount of wind.

In another aspect, the information may be divided into internal information that is information on each component (information on the operation or state (failure) of each component, on the energy consumption of the energy consumption component, and on the habit of a consumer who uses the energy consumption component), and external information (energy information, environmental information, program update information and time information) that is other information.

In this case, the information may be received from another component. That is, the received information includes at least energy information.

The specific component may be a component that configures the utility area network 10 or a component that configures the HAN 20.

The energy information I may be at least one of electricity, water, and gas information as described above.

As an example, the electricity related information includes time-based pricing, curtailment, grid emergency, grid reliability, energy increment, an energy generation amount, an operation priority, and an energy consumption amount. It may be said that price related to the energy source in the embodiment may be energy price.

The energy information may be divided into price information (energy price) and information other than price (the curtailment, the grid emergency, the grid reliability, the energy generation amount, the energy increment, the operation priority, and the energy consumption amount). The price information or the information other than the price may be transmitted along with time information. Alternatively, the time information may be transmitted instead of the price information or the information other than the price. As an example, time information that needs the curtailment may be received and transmitted on the energy grid.

Such information may be divided into scheduled information that is previously generated on the basis of previous information and real time information that varies in real time. The scheduled information and the real time information may be divided according to whether information on or after the current time (future) is predicted.

Moreover, the energy information I may be divided into the TOU information, the CPP information, and the RTP information according to the change pattern of data over time. In addition, the energy information I may vary over time.

Referring to FIG. 4(a), data varies step by step over time according to the TOU information. According to the CPP information, the data varies step by step over time or in real time, and emphasis appears at a specific time point. That is, in the case of the CPP pattern, a general price is lower than that of the TOU pattern but the price at the specific time point is remarkably more expensive than that of the TOU pattern.

Referring to FIG. 4(b), data varies in real time over time according to the RTP information.

On the other hand, the energy information I may be transmitted and received as a true or false signal such as a Boolean signal on the network system. Alternatively, actual price information may be transmitted and received, price information that has a plurality of levels may be transmitted and received, or the energy information I may be transformed to time information and then transmitted and received. In the following, electricity related information will be described along with an example.

When the specific component C receives a true or false signal such as a Boolean signal, it is possible to recognize any one signal as an on-peak signal and another signal as an off-peak signal.

Alternatively, the specific component may recognize at least one piece of driving related information and the specific component may compare a recognized information value with a reference information value to recognize on-peak and off-peak.

For example, if the specific component recognizes information having levels or actual price information, the specific component compares the recognized information value with the reference information value to recognize on-peak and off-peak.

In this case, the information value on the driving may be at least one of electric rates, a power amount, a rate of change in electric rates, a rate of change in power amount, an average value of the electric rates, and an average value of the power amount. The reference information value may be at least one of an average value, the average value of the minimum value and maximum value of power information during a certain section, and a reference change rate (for example, the slope of a consumption power amount per unit hour) in power information during a certain section.

The reference information value may be set in real time or may be previously set. The reference information value may be set in the utility area network or be set in the HAN (by a consumer's input, the energy management component's input, the central management component's input, and etc.)

If the specific component (for example, energy consumption component) recognizes on-peak (for example, at a recognized time point), an output may become zero (stop or maintaining the stop state) or be reduced. The specific component may previously determine a driving method before starting its operation, and change the driving method when recognizing on-peak after starting the operation.

In addition, if the specific component recognizes off-peak, the output may be recovered or increase if necessary. That is, if the specific component that recognizes on-peak recognizes off-peak, the output may be recovered to the previous state or become greater than a previous output.

In this case, even if the specific component recovers or increases the output after recognizing off-peak, the total consumption power and/or the total electric rate for the entire driving time of the specific component decreases.

Alternatively, when the specific component recognizes on-peak (for example, at a recognized time point), the output may be maintained under an operable condition. In this case, the operable condition means when the information value for driving is smaller than or equal to a certain reference value. The information value for driving may be information on electric rates, on a consumption power amount or on an operation time. The certain reference value may be a relative value or an absolute value.

The certain reference value may be set in real time or may be previously set. The certain reference value may be set in the utility area network or be set in the HAN (by a consumer's input, an energy management component's input, a central management component's input).

Alternatively, if the specific component recognizes on-peak (for example, at a recognized time point), the output may increase. However, even if the output increases at a time point when on-peak is recognized, the total output for the entire driving period of the specific component may become greater or be maintained than or at the total output when the specific component operates at a normal output.

Alternatively, even if the output increases at a time point when on-peak is recognized, the total consumption power or the total electric rates for the entire driving period of the specific component may become less than the total consumption power or the total electric rates when the specific component operates at a normal output.

If the specific component recognizes off-peak (for example, at a recognized time point), the output may increase. For example, if an operation is reserved, the specific component may start driving before a preset time or a component having a greater output among the plurality of components may first drive.

Moreover, in the case of a refrigerator, it is possible to make the output greater than a typical output and to supercool it or in the case of a washing machine or a dish washer, it is possible to drive a heater earlier than a time reserved to operate the heater and store hot water in a hot water tank. The reason is to decrease electric rates by previously operating the heater at off-peak, instead of operating the heater at on-peak that arrives later.

Alternatively, if the specific component recognizes off-peak (for example, at a recognized time point), it is possible to store electricity.

According to an embodiment, the specific component (for example, the energy consumption component) may maintain, decrease or increase the output. Thus, the specific component may include a power changing component. Since the power may be defined by using a current and a voltage, the power changing component may include a current regulator and/or a voltage regulator. The power changing component may operate according to a command that is generated from, for example, the energy management component.

On the other hand, the curtailment information is information related to a mode in which a component stops or electric rates are low. The curtailment information may be transmitted and received as a true or false signal such as a Boolean signal on the network system. That is, a turn off signal or a lower power signal may be transmitted and received.

If the specific component recognizes curtailment information, it may make an output zero (stop or maintain the stop state: in a case where the turn off signal is recognized) or decrease the output (in a case where the lower power signal is recognized) as mentioned above.

As another example, the curtailment information may include time information. The time information is information on a length of a time when energy needs to be saved. In addition, a way of saving the energy may vary depending on the time information.

As an example, if the length of the time when energy needs to be saved is longer than a reference value, an electrical appliance may operate in a delay appliance load mode. On the contrary, if the length of the time when energy needs to be saved is less than a reference value, an electrical appliance may operate in a temporary appliance load reduction mode.

In the specification, a functionality in which a specific component receiving curtailment information operates in response thereto may be called a demand response functionality. In addition, if the length of the time when energy needs to be saved is equal to or greater than a reference value, a capability in which a specific component may operate in a delay appliance load mode is a delay appliance load capability. Moreover, when the length of the time when energy needs to be saved is less than a reference value, a functionality in which a specific component may operate in a temporary appliance load delay mode may be called a temporary appliance load reduction capability.

The grid emergency information is information related to blackout and may be transmitted and received as a true or false signal such as a Boolean signal. The information related to blackout may be related to the reliability of a component that uses energy.

If the specific component recognizes grid emergency information, it may be immediately shut down.

If the specific component receives the grid emergency information as scheduled information, the specific component may increase the output before having the grid emergency and perform the same operation as that at the above described off-peak of the specific component. In addition, at the emergency time point, the specific component may be shut down.

The grid reliability information is information on whether a lot of electricity is supplied or on the quality of electricity, and may be transmitted as a true or false signal such as a Boolean signal or a component may determine through a frequency of an AC power supply that is supplied to the component (for example, an electrical appliance).

That is, if a under-frequency that is lower than a reference frequency of an AC power supply supplied to the component is sensed (recognized), it is determined that the amount of the supplied electricity is small (information that the amount of the supplied electricity is insufficient ((hereinafter, referred to as "supplied electricity-amount insufficiency information")), and if an over-frequency that is higher than a reference frequency of an AC power supply supplied to the component is sensed (recognized), it is determined that the amount of the supplied electricity is large (information that the amount of the supplied electricity is excessive (hereinafter, referred to as "supplied electricity-amount excess information")).

If the specific component recognizes from the grid reliability information that the amount of electricity is small or the quality of electricity is not good (the supplied electricity-amount insufficiency information), the specific component may make the output zero (stop or maintain the stop state), decrease, maintain or increase the output depending on the case as mentioned above.

On the contrary, if the supplied electricity-amount excess information is recognized, the specific component may increase the output or be switched from an off state to an on state.

The energy increment information is information on when extra electricity is generated because the electricity consumption of a component consuming energy is less than generation, and may be transmitted and received as a true or false signal such as a Boolean signal.

If the specific component recognizes energy increment information, it is possible to increase the output. For example, if an operation is reserved, the specific component may start driving before a preset time or a component having a greater output among the plurality of components may first drive. Moreover, in the case of a refrigerator, it is possible to make the output greater than a typical output and to super-cool it or in the case of a washing machine or a dish washer, it is possible to drive a heater earlier than a time reserved to operate the heater and store hot water in a hot water tank.

The on-peak information, the curtailment information, and the supplied electricity insufficiency information among the above-described energy information may be recognized as high-price information of which energy price is considered to be relatively expensive. In this case, a section in which the high-price information is recognized may be referred to as a high-price section.

On the contrary, the off-peak information, the energy increment information, and the supplied electricity-amount excess information among pieces of energy information may be recognized as low-price information of which energy price is considered to be relatively cheap. In this case, a section in which the low-price information is recognized may be referred to as a low-price section.

The information on the level of the energy price (high-price or low-price information) may be recognized as information for determining a power-saving scheme for a specific component (such as energy consumption component). That is, by using the information on the level of the energy price, it is possible to divide and recognize a time period (domain) according to the energy price or a pricing period (domain) for determining a driving scheme for a component into at least two levels.

As an example, if the energy information is recognized as a Boolean signal, the number of the time periods according to the energy price or the pricing periods for determining the driving scheme for the component may be recognized as two. If the energy information is divided into a plurality of levels or recognized as real-time information, the number of the time periods or the pricing periods may be recognized as three or larger.

On the other hand, the information on the energy price corresponding to at least time may be divided and recognized into pieces of information for determining a power-saving scheme for a component. That is, by using the information on the energy price, it is possible to divide and recognize a time period (domain) or a pricing period (domain) into at least two or more levels. As described above, the divided time period or pricing period may be determined according to the type of recognized information (Boolean, multi-level, real-time information).

In other words, by using the information on the level of the energy price, it is possible to divide and recognize two or more determinants for driving a component and the determinants may include functions related to time and the energy price.

If the information on the energy price is recognized as two or more levels, a driving scheme for a specific component may be determined according to the information having the levels.

On the other hand, if the recognized information on the energy price is not divided according to a specific reference (such as in the case of real-time price information), the information on the energy price is compared with certain information, and according to the comparison result, a driving scheme for a specific component may be determined.

Here, the certain information may be reference information (such as a reference value) for dividing the information on the energy price, and the comparison result may be related to whether the information on the energy price is over or below the reference value.

On the other hand, pieces of the energy information may be divided into a first piece of information I1 that is unrefined, a second piece of information I2 that is information refined from the first piece of information I1, and a third piece of information I3 that is information for performing the function of the specific component. That is, the first piece of information I1 is raw data, the second piece of information I2 is refined data, and the third piece of information I3 is a command for performing the function of the specific component.

In addition, the energy information is delivered along with a signal. In this case, one or more of the first to third pieces of information may be delivered several times with signal transformation and without content transformation.

As an example, any component that receives a signal including the first piece of information I1 may just transform the signal and transmit a new signal including the first piece of information I1 to another component, as shown in figures.

Thus, signal transformation and information transformation in the embodiment are described as different ideas. In this case, it may be easily understood that when the first piece of information is transformed to the second piece of information, a signal is also transformed.

However, the third piece of information may be delivered several times while its content is transformed or while its content is equally maintained and only its signal is transformed.

Specifically, if the first piece of information I1 is unrefined electric rate information, the second piece of information I2 may be refined electric rate information. The refined electric rate information is information that electric rate is divided into a plurality of levels or analyzed information. The third piece of information I3 is a command that is generated on the basis of the first piece of information I1 or the second piece of information I2.

A specific component may generate, transmit or receive one or more of the first to third pieces of information I1 to I3. The first to third pieces of information I1 to I3 is not necessarily sequentially transmitted and received.

For example, only the third piece of information I3 may be transmitted and received sequentially or in parallel without the first and second pieces of information I1 and I2. Alternatively, the first and third pieces of information I1 and I3 may be together transmitted or received, the second and third pieces of information I2 and I3 may be together transmitted or received, or the first and second information I1 and I2 may be together transmitted or received.

As an example, if a specific component receives the first piece of information I1, the specific component may transmit the second piece of information I2, transmit the second and third pieces of information I2 and I3, or transmit only the third piece of information I3.

If the specific component receives only the third piece of information I3, the specific component may generate and transmit the third piece of information I3 that is new.

On the other hand, any one of two pieces of information is a message and the other is a response to the message. Thus, each component configuring a network system may transmit or receive a message, and if the message is received, each component may respond to the received message. Thus, a transmission of a message and a response to the transmission are relative ideas in the case of individual components.

The message may include data (the first piece of information I1 or the second piece of information I2) and/or a command (the third piece of information I3).

The command (third piece of information I3) may include a command to store data, a command to generate data, a command to refine data (including generating additional data), a command to generate an additional command, a command to transmit an additionally generated command, and a command to deliver a received command.

In the specification, responding to a received message means storing data, refining data (including generating additional data), generating a new command, transmitting a newly generated command, simply delivering a received command (a command to deliver the command to another component may be together generated), operation, transmitting stored information, and transmitting an acknowledge character or a negative acknowledge character.

For example, if the message is a first piece of information, a component that receives the first piece of information may refine the first piece of information and generate a second piece of information, generate a second piece of information and a third piece of information that is new, or generate only a third piece of information, in response to the reception.

In particular, if the energy management component 24 receives a first piece of information (internal information and/or external information), the energy management component 24 generate a second piece of information and/or a third piece of information and transmit the information to one or more components (such as the energy consumption component) that configures the HAN. In addition, the energy consumption component 26 may operate according to the third piece of information received from the energy management component 24.

Figure 5:
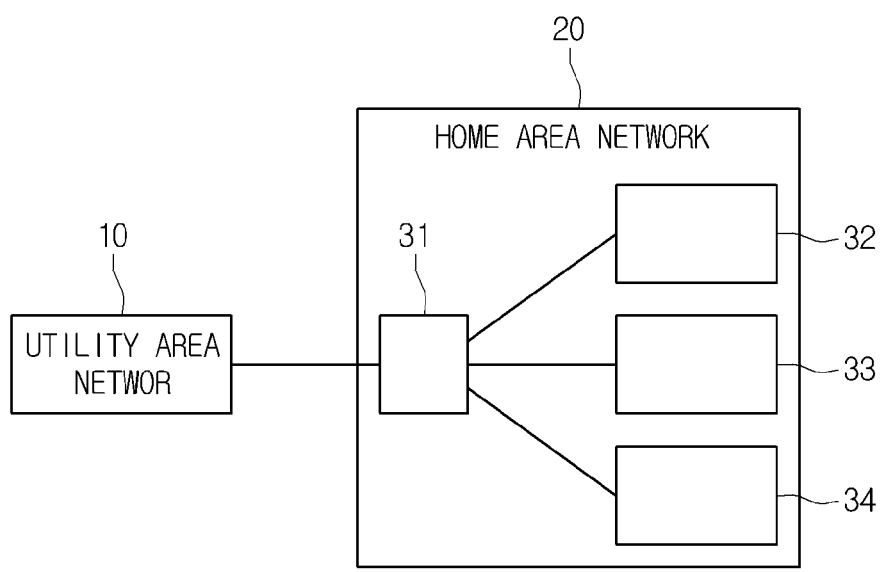
FIG. 5 is a schematic block diagram of a first embodiment of a network system according to an embodiment.

FIG. 5 is a schematic block diagram of a first embodiment of a network system according to an embodiment.

Referring to FIG. 5, a first component 31 of the HAN may communicate directly with the utility area network 10. The first component 31 may communicate with a plurality of components 32 to 34 of the HAN, second to fourth components. In this case, it is clear that the number of components of the HAN that communicate with the first component 31 is not limited.

That is, in the embodiment, the first component 31 functions as a gateway. The first component 31 may be one of the energy management component, the energy metering component, the central management component, the energy grid assistance component, and the energy consumption component, for example.

A component that functions as a gateway in the embodiment enables the communication between components that communicate with each other by using different communication protocols, and enables the communication between components that communicate with each other by using the same communication protocol.

Each of the second to fourth components 32 to 34 may be one of the energy generation component, the energy distribution component, the energy management component, the energy storage component, the energy metering component, the central management component, the energy grid assistance component, and the energy consumption component.

The first component 31 may receive information from the utility area network 10 or one or more components that configure the utility area network 10, deliver or refine the received information, and transmit the information to the second to fourth components 32 to 34. For example, in a case where the first component 31 is the energy metering component, the first component may receive electric rate information and transmit it to the energy management component, the energy consumption component, and etc.

In addition, each of the second to fourth components may communicate with another component. For example, the first component 31 may be the energy metering component, the second component may be the energy management component, and the energy management component may communicate with one or more energy consumption components.

Figure 6:
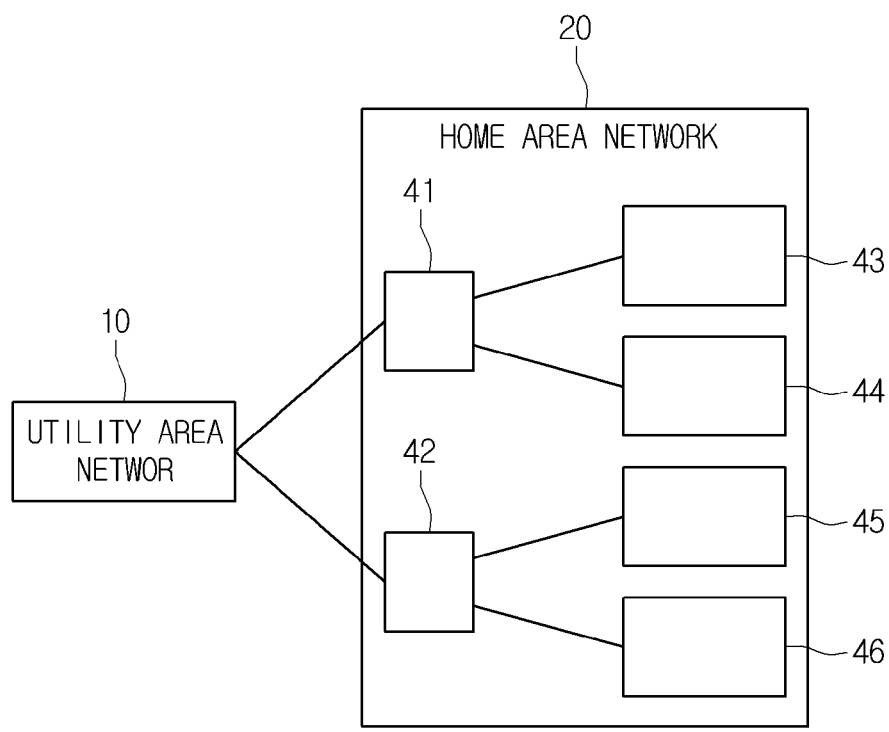
FIG. 6 is a schematic block diagram of a second embodiment of a network system according to an embodiment.

FIG. 6 is a schematic block diagram of a second embodiment of a network system according to an embodiment.

Referring to FIG. 6, a plurality of components that configure the HAN 20 of the embodiment may communicate directly with the utility area network 10.

That is, the embodiment includes a plurality of components (such as first and second components 41 and 42) that function as a gateway. The first and second components may be the same type of component or different types of components.

In addition, the first component 41 may communicate with one or more components (such as third and fourth components 43 and 44), and the second component 42 may communicate with one or more components (such as fifth and sixth components 45 and 46).

For example, each of one of the first and second components may be one of the energy management component, the energy metering component, the central management component, the energy grid assistance component, and the energy consumption component.

Each of the third to sixth components may be one of the energy generation component, the energy distribution component, the energy management component, the energy metering component, the central management component, the energy grid assistance component, and the energy consumption component.

Figure 7:
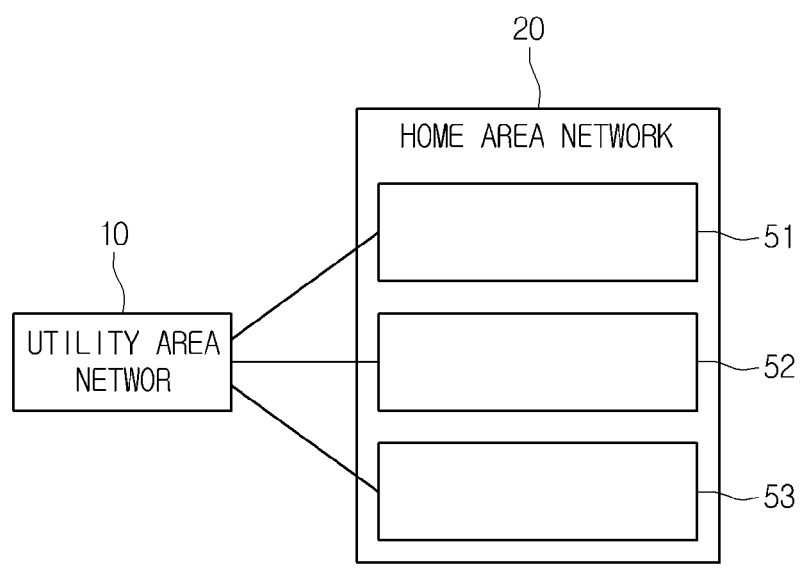
FIG. 7 is a schematic block diagram of a third embodiment of a network system according to an embodiment.

FIG. 7 is a schematic block diagram of a third embodiment of a network system according to an embodiment.

Referring to FIG. 7, each of components 51 to 53 that configure the HAN of the embodiment may communicate directly with the utility area network 10. That is, unlike the first and second embodiments, there is no component that functions as a gateway, and each of the components 51 to 53 may communicate with the utility area network.

Figure 8:
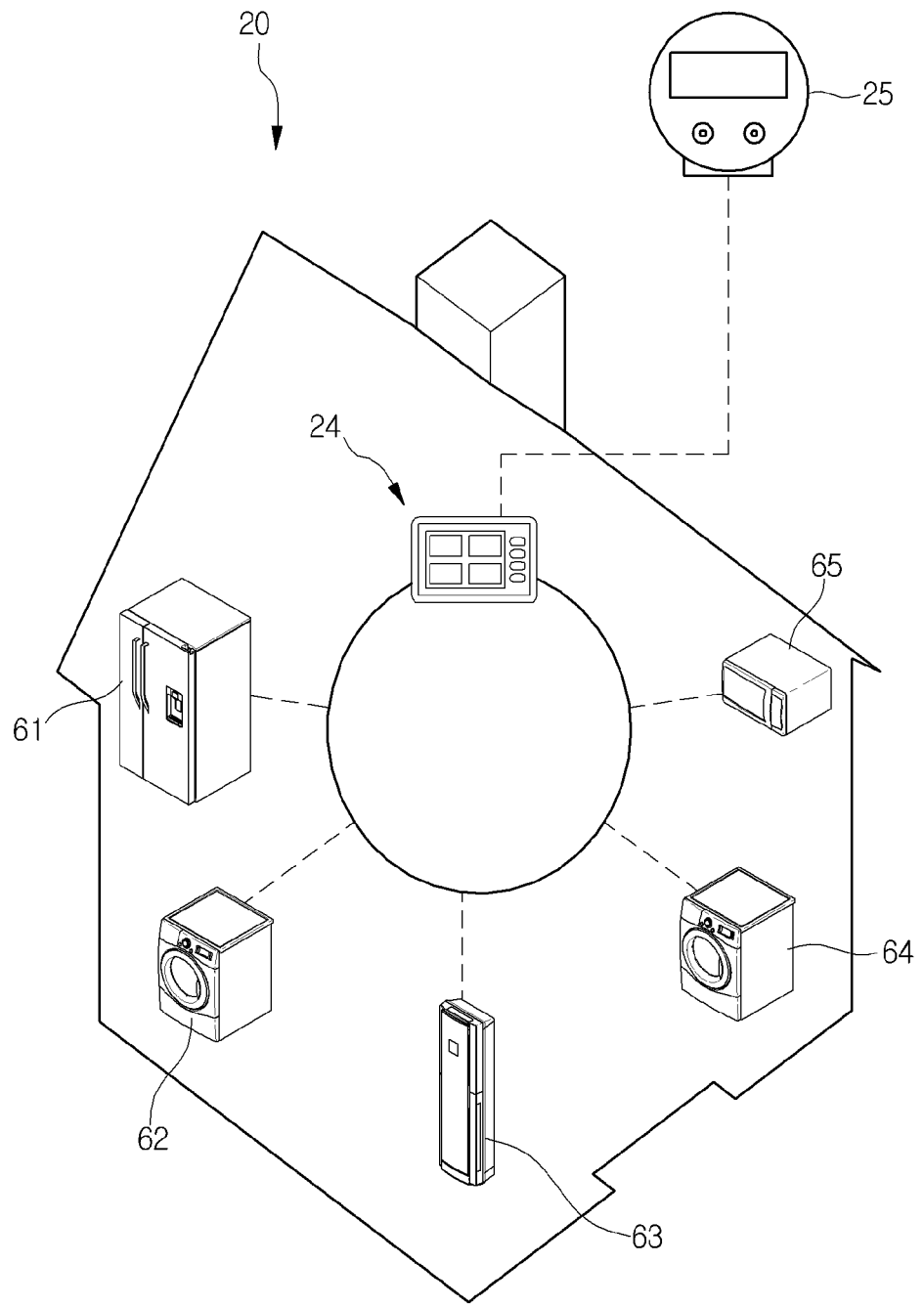
FIG. 8 is a schematic diagram of a home area network according to an embodiment.

FIG. 8 is a schematic diagram of a HAN according to an embodiment.

Referring to FIG. 8, the HAN 20 according to the embodiment includes the energy metering component 25 that may meter power supplied from the utility area network 10 to each home and/or electric rate in real time, such as a smart meter, and the energy management component 24 that is connected to the energy metering component and electrical appliances and controls their operations.

On the other hand, electric rate for each home may be charged as rate per hour. In a time period where a power consumption amount sharply increases, the electric rate per hour go up, and in the middle of the night when the power consumption amount is relatively less, the electric rate per hour may go down.

The energy management component 24 may be connected to electrical appliances as the energy consumption component 26, such as a refrigerator 61, a washing machine 62, an air conditioner 63, a drying machine 64 or a cooking device 65 through a home network to make bidirectional communication.

A home area communication may be made by using a wireless technique such as by using Zigbee, wifi, Bluetooth or through a wire such as a power line communication technique, and one electrical appliance may be connected to be able to communicate with other electrical appliances.

Figure 9:
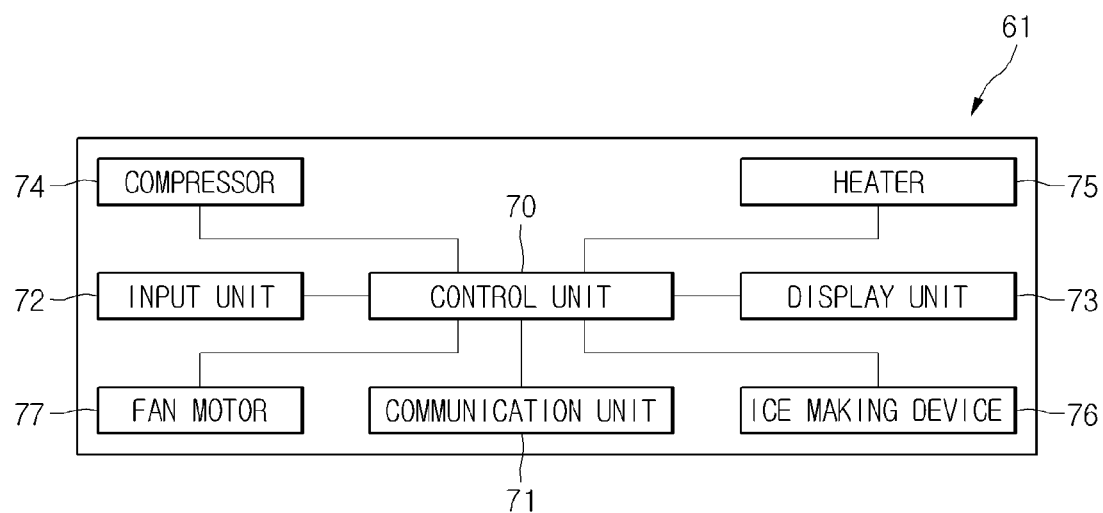
FIG. 9 is a block diagram of components for a network system of an embodiment.

FIG. 9 is a block diagram of components for a network system of an embodiment.

As an example of a component for a network system, a refrigerator among energy consumption components (or electrical appliances) will be described below. The description on the refrigerator may also be applied equally to other energy consumption components. In addition, it is clear that the description on the energy consumption component may also be applied to components other than the energy consumption component.

Referring to FIG. 9, the refrigerator 61 for a network system according to the embodiment may include a communication unit 71 for performing communication with other components that configure the network system.

The communication unit 71 may receive at least the curtailment information from other components. The curtailment information may include information on a restriction time period in which energy needs to be saved.

The refrigerator 61 may include an input unit 72 with which a certain command may be input, a display unit 73 that displays driving information for the refrigerator or information recognized from the communication unit 71, and a control unit 70 that controls at least the display unit 73. The control unit 70 may also control the overall operation of the refrigerator 61.

In a case where the display unit 73 includes a touch screen through which a command may be input by using a touch technique, a whole or portion of the input unit 72 may be included in the display unit 73. That is, a whole or portion of the input unit 72 may be implemented in the display unit 73.

The refrigerator 61 may further include a compressor 74 that is used for cooling the inside of the refrigerator 61, a heater 75 for performing defrosting, an ice making device 76 for generating ice, and a fan motor 77 that drives a fan for circulating cold air.

The control unit 70 may receive information that the communication unit 71 receives. The control unit 70 may control the compressor 74, the heater 75, the ice making device 76, the fan motor 77, and etc., based on information received from the communication unit 71 and information inputted from the input unit 72.

The compressor 74 may be turned on/off so that the temperature in the refrigerator may maintain a desired temperature.

The heater 75 may be turned on if it is determined that it is needed to defrost an evaporator (not shown).

The ice making device 76 may include an ice moving unit that has, for example, a motor, so as to send generated ice to a storage tank (not shown). Since the ice making device and the ice moving unit in the embodiment may be implemented by using a known technology, their detailed descriptions are skipped.

The refrigerator 61 may be set to perform a power saving functionality or an ordinary functionality. The power saving functionality is a functionality for decreasing energy consumption or energy price as compared to the ordinary functionality. The power saving functionality may be performed based on energy information or by a user's setting. As an example, the power saving functionality or the ordinary functionality may be selected and changed by the input unit 72 or the display unit 73.

As another example, any one of the power saving functionality and the ordinary functionality may be automatically set according to whether the refrigerator 61 communicates with other components. Alternatively, the functionality may be automatically changed while any one of the power saving functionality and the ordinary functionality is automatically set, or the functionality may be manually changed by using a functionality switch button.

A mode in which the power saving mode is performed may be referred to as a power saving mode, a mode in which the ordinary functionality is performed may be referred to as an ordinary mode. In addition, the power saving mode in the embodiment may include a plurality of modes.

In addition, the power saving mode is the above-described demand response functionality.

In a case where the display unit 73 is applied to the refrigerator, the display unit 73 may display door-opening alerting information if a refrigerator door is opened for a time period equal to or longer than a certain value. In this case, door-opening alerting information that is displayed if the demand respond functionality becomes on may be different from door-opening alerting information that is displayed if the demand respond functionality becomes off.

The display unit 73 may display information for alerting when to clean some parts of the refrigerator that require cleaning. In this case, the parts requiring the cleaning may be a filter, a heat exchanger that is used for exchanging heat, and etc.

Moreover, the display unit 73 may display warning information if the refrigerator consumes energy equal to or more than a certain value. In this case, the certain value may be set when manufacturing the refrigerator or be set by a user.

On the other hand, information that is not displayed on the display unit 73 may be outputted through a sound output unit. Moreover, information that is displayed or not displayed on the display unit 76 may be transmitted to one or more components that configure the HAN or the utility area network.

Figure 10:
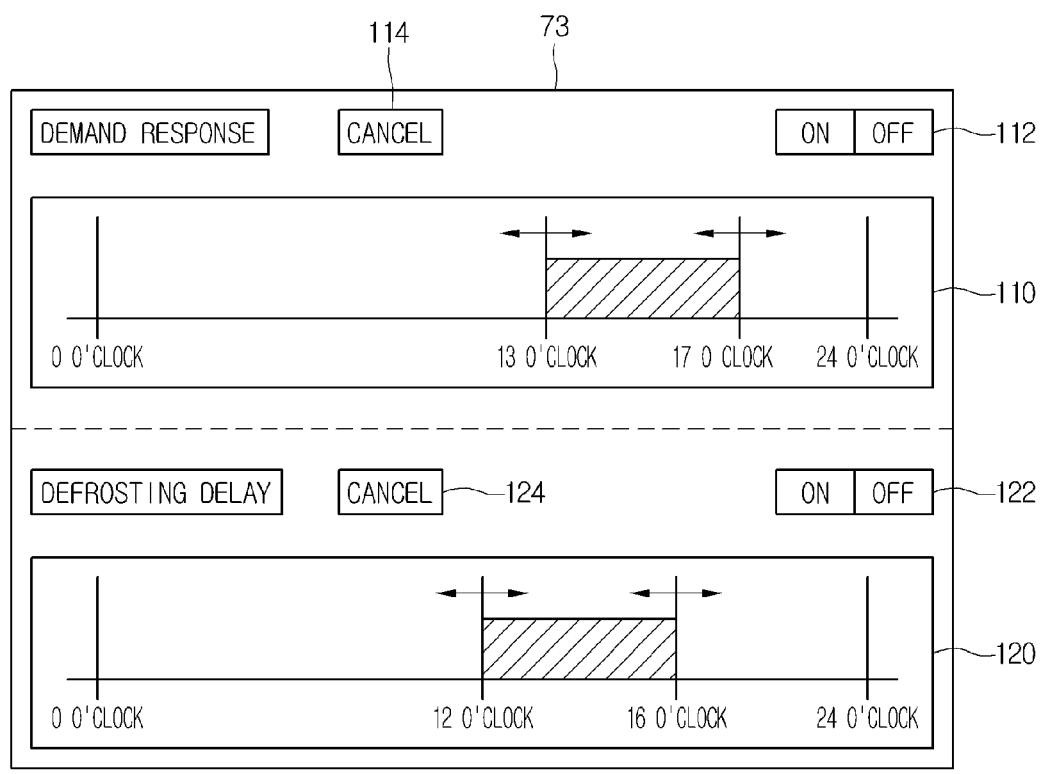
FIG. 10 is an example of a display unit of a component according to an embodiment.

FIG. 10 is an example of a display unit of a component according to an embodiment. In FIG. 10, a screen displayed on the display unit of the refrigerator 61 is shown as an example.

Referring to FIG. 10, a screen for enabling the demand response functionality to be selected may be displayed on the display unit 73.

A selection unit 112 for enabling the demand response functionality to be selected may be displayed on the screen. The demand response functionality may become on or off by using the selection unit 112.

As an example, the selection unit 112 may include both an on button and an off button or only one button. When the selection unit 112 includes one button, on or off may be selected according to how many times the button is pressed. Alternatively, in a case where the selection unit 112 receives a command by using a touch technique, a user may select on or off by touching and moving a bar for selecting on or off.

In the specification, it is clear that there is no limitation on a way of operating the demand response functionality.

If the demand response functionality is on, save time information 110 to save energy may be displayed on the screen. That is, time information that is included in received curtailment information may be displayed.

As an example, the screen may display, within a range of 24 hours without limitation, one or more save time periods in which energy needs to be saved.

The save time period may include a start time and an end time. For example, a time graph including 24 hours may be displayed so that a save time period may have a specific color. In addition, the current time may be separately displayed on the time graph. That is, the save time period may be distinguished from other sections and displayed on the screen and the display method is not limited to the above-described examples.

The maximum length of the save time period in which the refrigerator may receive may be shorter than or equal to four hours as an example. In addition, a reference value that distinguishes the delay appliance load mode from the temporary appliance load reduction mode may be, for example, 11 minutes. However, the maximum length and the reference value may vary in the specification.

A user may change the length of the save time period that is displayed on the screen. As an example, it is possible to reduce the length of the save time period. It is possible to delay the start time of the save time period, advance the end time of the save time period, or delay the start time of the save time period and advance the end time of the save time period.

For example, a user may touch and move the border of the start time of the save time period. Moreover, the user may touch and move the border of the end time of the save time period.

In addition, if the current time arrives at the start time of the save time period or matches the save time period, the component operates in the delay appliance load mode or in the temporary appliance load reduction mode.

The user may release the demand response functionality while the component operates in the delay appliance load mode or in the temporary appliance load reduction mode. That is, if the user does not want to perform the demand response functionality, the user may select a cancel button 114 or a release button and release the demand response functionality. Alternatively, it is possible to release the demand response functionality by making the demand response functionality off by using the selection unit 112.

The selection unit 122 that may select a defrosting delay function may be displayed on the screen. The defrosting delay function in the specification is a power saving function that is selected by a user. That is, the user may select the defrosting delay function irrespective of whether energy information is received.

A mode in which the defrosting delay function is performed is also a power saving mode. Thus, the power saving mode of a component (electrical appliance) in the specification may include a first power saving mode in which at least the demand response function is performed, and a second power saving mode in which the defrosting delay function is performed. In addition, the first power saving mode may include the delay appliance load mode and the temporary appliance load reduction mode.

Since the on/off method of the defrosting delay function using the selection unit 122 is the same as the on/off method of the demand response function using the selection unit 112, its detailed description is skipped.

If the defrosting delay function is on, time information 120 to be defrosting-delayed may be displayed. As an example, a delay time period to be defrosting-delayed may be divided and displayed on the screen within a range of 24 hours. In this case, a piece or pieces of delay time period information may be displayed. In addition, the delay time period may be pre-stored in a memory that is not shown.

The delay time period may include a start time and an end time. For example, a time graph including 24 hours may be displayed so that a save time period has a specific color. In addition, the current time may be separately displayed on the time graph. That is, the delay time period may be distinguished from other sections and displayed on the screen and the display method is not limited to the above-described examples.

The maximum length of the delay time period may be shorter than or equal to, for example, four hours. In addition, when initially manufacturing the component, the maximum length of the delay time period, the start time and the end time may be set. As an example, when one delay time period is set, the delay time period may be from 6 a.m. to 10 p.m. or from 3 p.m. to 7 p.m. As another example, when two delay time periods are set, a first delay time period may be from 6 a.m. to 10 p.m. and a second delay time period may be from 3 p.m. to 7 p.m.

In addition, if the defrosting delay function is on, a set delay time period may be displayed on the time graph.

A user may change the length of the delay time period displayed on the screen. As an example, it is possible to reduce the length of the delay time period. As another example, it is possible to change the start time or the end time of the delay time period.

As an example, it is possible to delay or advance the start time of the delay time period. Alternatively, it is possible to advance or delay the end time of the delay time period.

For example, a user may touch and move the border of the start time of the delay time period to the left and right sides. Moreover, the user may touch and move the border of the end time of the delay time period to the left and right sides.

However, one of the start time and the end time of the delay time period is changed because the maximum length of the delay time period is set, but if a changed delay time period exceeds the maximum length, the other of the start time and the end time of the delay time period may be automatically changed. For example, when the delay time period is from 3 p.m. to 7 p.m., the end time of the delay time period may be automatically changed to 6 p.m. if a user changes the start time of the delay start section to 2 p.m. However, if a user changes the start time of the delay time period to 4 p.m., the end time may not be changed.

While the defrosting delay function is on, the defrosting operation of the refrigerator is restricted if the current time arrives at the start time of the delay time period or matches the start time of the delay time period. In this case, a user may release the defrosting delay function. That is, if the user does not want the refrigerator to perform the demand response function, the user may select the cancel button 124 or a release button and release the defrosting delay function. Alternatively, it is possible to release the defrosting delay function by making the defrosting delay function off by using the selection unit 122.

In the specification, the demand response functionality and the defrosting delay function may not simultaneously become on but only any one of them may become on. As an example, if any one of the demand response functionality and the defrosting delay function becomes on, the other may become off. Of course, both the demand response functionality and the defrosting delay function may become off.

In this case, the demand response functionality and the defrosting delay function may have an order of priority. That is, even if the defrosting delay function becomes on, the defrosting delay function may become off and the demand response functionality may become on when the current time arrives at the start time of the save time period. That is, when at least a portion of the restriction time period of the demand response functionality overlaps with at least a portion of the restriction time period of the defrosting delay function, the demand response functionality may have priority. Of course, in this case, information for informing a user that the defrosting delay function became off and the demand response functionality became on may be displayed on the display unit 73.

How the refrigerator operates in response to the demand response functionality will be described below.

Figure 11:
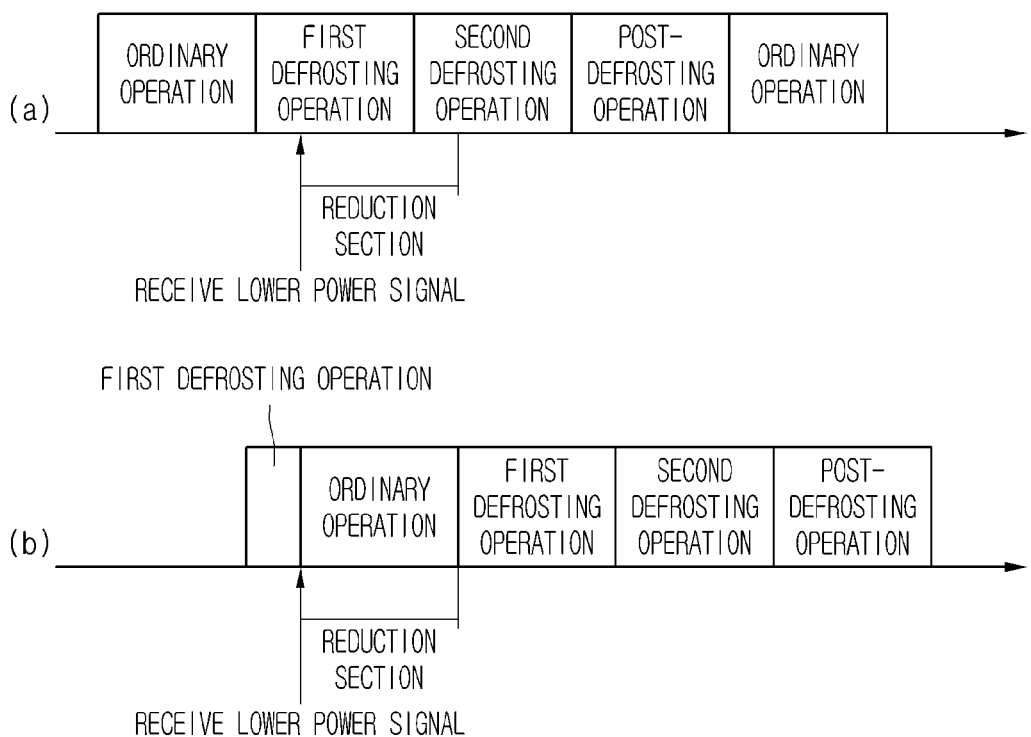
FIGS. 11(a), 11(b), 12(a), and 12(b) are diagrams for explaining how a refrigerator operates in a first exemplary reduction method in response to a demand response functionality.

FIGS. 11(*a*), 11(*b*), 12(*a*), and 12(*b*) are diagrams for explaining how a refrigerator operates in a delay appliance load mode in response to the demand response functionality.

In the specification, the delay appliance load mode is, for example, a mode in which a defrosting operation is restricted.

An operation that a refrigerator operates to keep the inside of the refrigerator at a desired temperature is referred to as an ordinary operation. In addition, an operation that the refrigerator operates for defrosting of an evaporator is referred to as a defrosting operation. In addition, an operation that the refrigerator operates after defrosting is completed is referred to as a post-defrosting operation. In general, the refrigerator operates in order of the ordinary operation, the defrosting operation, the post-defrosting operation, and the ordinary operation. However, the post-defrosting operation may be skipped in the specification. The defrosting operation may include a plurality of sub operations. That is, the defrosting operation may include a first defrosting operation and a second defrosting operation. Alternatively, the defrosting operation may include the first defrosting operation, the second defrosting operation, or the post-defrosting operation.

Firstly, the refrigerator performs the defrosting operation if defrosting an evaporator is needed while the refrigerator is in ordinary operation.

In the second defrosting operation, the compressor 74 stops and the heater 75 becomes on. In general, if the compressor 74 stops, the temperature in the refrigerator rises.

In the first defrosting operation, the compressor 74 operates so that before the second defrosting operation, the temperature in the refrigerator becomes a temperature lower than a set temperature. That is, as the compressor 74 stops in the second defrosting operation, the temperature in the refrigerator rises. Thus, the difference between the temperature in the refrigerator and the set temperature is minimized before the second defrosting operation by lowering the temperature in the refrigerator before the second defrosting operation starts.

In the post-defrosting operation, the compressor 74 operates until the temperature in the refrigerator arrives at a set temperature. In this case, since the compressor becomes on also in the ordinary operation until the temperature in the refrigerator arrives at a set temperature, the post-defrosting operation may be skipped as described above.

In addition, the function of the compressor in the ordinary operation is referred to as a first function, the function of the compressor in the first defrosting operation is referred to as a second function, and the function of the compressor in the post-defrosting operation is referred to as a third function. The functions of the compressor may be switched according to modes.

Firstly, referring to FIGS. 11(*a*) and 11(*b*), if the refrigerator receives the curtailment information in the first defrosting operation or the save time period starts ("receiving a lower power signal" will be described below as an example), the refrigerator performs the ordinary operation until the save time period ends.

In addition, if the save time period ends, the refrigerator performs the first defrosting operation from the beginning. That is, if the refrigerator receives a lower power signal in the first defrosting operation, it ends the first defrosting operation and performs the ordinary operation. In addition, if the save time period ends in the ordinary operation, the refrigerator starts again the first defrosting operation.

According to the embodiment, since the refrigerator performs the ordinary operation during the save time period, there is an advantage in that it is possible to decrease energy price as compared to the case of the first defrosting operation.

Figure 12:
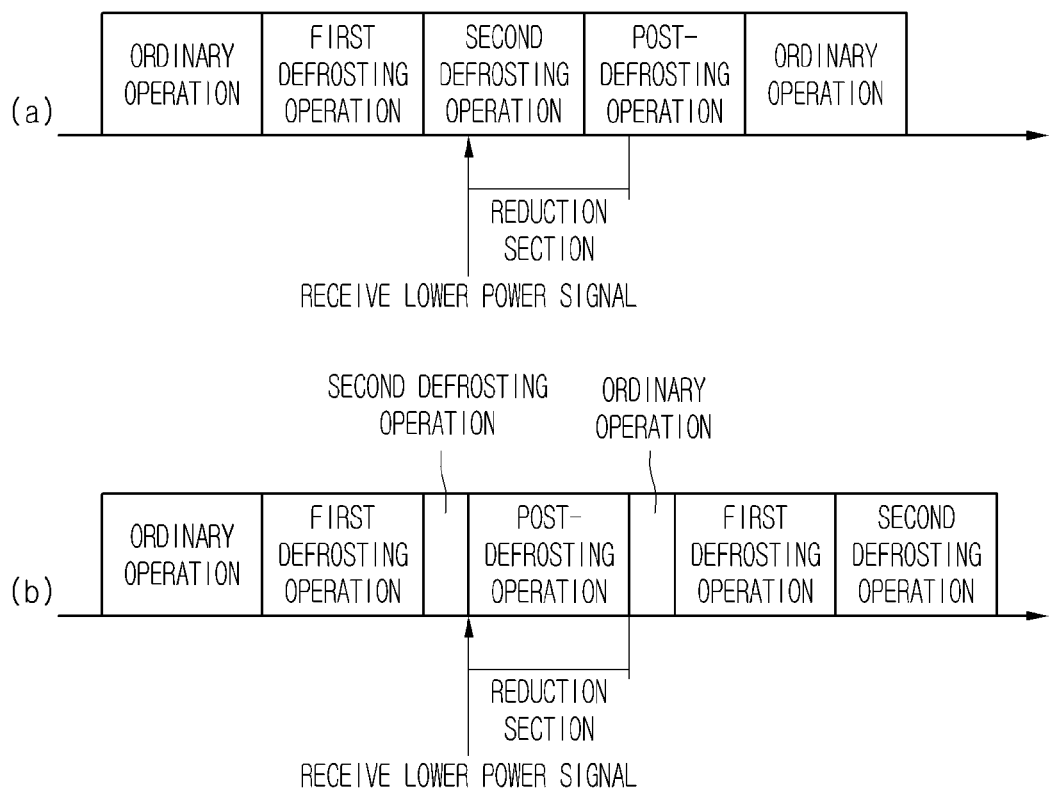

Next, referring to FIGS. 12(*a*) and 12(*b*), if the first defrosting operation is completed and the refrigerator receives a lower power signal while performing the second defrosting operation, the refrigerator may end the second defrosting operation and perform the post-defrosting operation. In addition, if the save time period ends, the refrigerator may determine whether there is a need for the defrosting operation, start the defrosting operation or perform the ordinary operation.

In this case, if the post-defrosting operation ends during the save time period, the refrigerator may perform the ordinary operation during the save time period. Alternatively, if the post-defrosting operation is completed during the save time period and there is a need for the defrosting operation while performing the ordinary operation, the refrigerator does not start the first defrosting operation in the save time period but may start the first defrosting operation if the save time period ends.

On the other hand, if the refrigerator receives the lower power signal in the ordinary operation, it may continue to perform the ordinary operation.

In the specification, the delay appliance load mode may include a mode in which the operation of an ice moving unit is restricted. For example, if the refrigerator receives a lower power signal while the ice moving unit operates, the operation of the ice moving unit stops, and if the save time period ends, the ice moving unit may operate.

Moreover, even if there is a need for the operation of the ice moving unit in the save time period while the ice moving unit stops, the ice moving unit maintains a stop state in the save time period, and if the save time period ends, the ice moving unit operates.

In the specification, the delay appliance load mode includes one or more of a defrosting operation restricting mode and an ice moving unit restricting mode. That is, any one of the defrosting operation restricting mode and the ice moving unit restricting mode may be applied to the refrigerator or both of them may be applied thereto.

On the other hand, the defrosting delay function is the same as the function of restricting the defrosting operation. That is, in a case where the defrosting delay function becomes on, if the delay time period starts in the first defrosting operation as shown in FIG. 11(*a*), the first defrosting operation ends and the refrigerator performs the ordinary operation as shown in FIG. 11(b). In addition, if the delay time period ends, the refrigerator starts the first defrosting operation from the beginning.

Moreover, if the delay time period starts in the second defrosting operation as shown in FIG. 12(a), the second defrosting operation ends and the refrigerator performs post-defrosting operation as shown in FIG. 12(b).

In addition, even while the delay appliance load mode is performed or the defrosting delay function becomes on and the defrosting operation restriction is performed, a user may release the defrosting delay function or the demand response functionality by using the cancel buttons 114 and 124 as described above.

FIGS. 13(a), 13(b), 14(a), and 14(b) are diagrams for explaining how a refrigerator operates in a temporary appliance load reduction mode in response to the demand response functionality.

Figure 13:
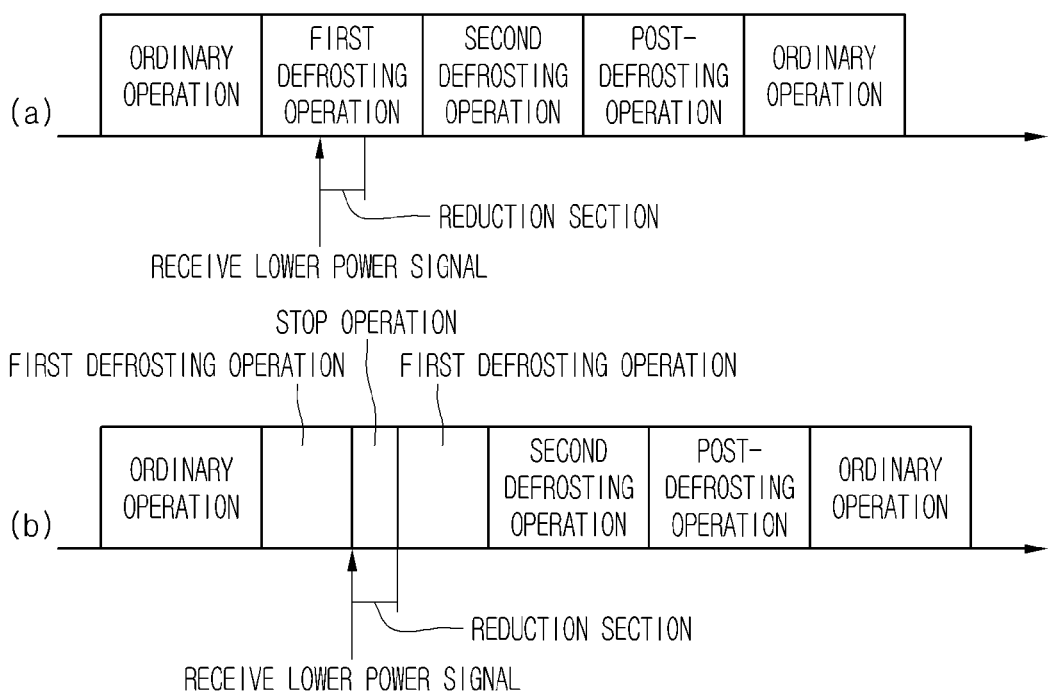
FIGS. 13(a), 13(b), 14(a), and 14(b) are diagrams for explaining how a refrigerator operates in a second exemplary reduction method in response to a demand response functionality.

Firstly, referring to FIGS. 13(a) and 13(b), if the refrigerator receives a lower power signal while performing the first defrosting operation, the first defrosting operation stops and the refrigerator stops its operation. That is, the compressor 74 and the fan motor 77 stop their operations. In addition, the heater 75 maintains a stop state.

If the lower power signal is received while the ice moving unit operates, the operation of the ice moving unit stops. If the lower power signal is received while the ice moving unit stops, the ice moving unit maintains the stop state.

If the save time period ends while the operation of the refrigerator stops, the refrigerator resumes a first defrosting operation. That is, if the save time period ends, the first defrosting operation does not start from the beginning but starts where the first defrosting operation previously stopped.

Figure 14:
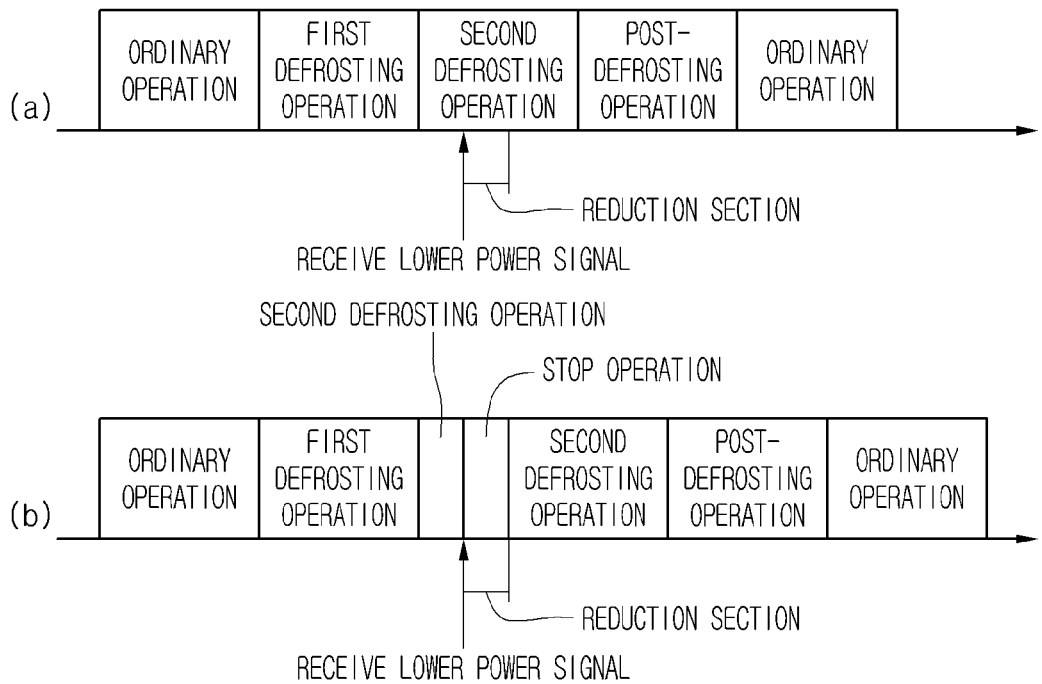

Next, referring to FIGS. 14(a) and 14(b), if a lower power signal is received while the refrigerator performs a second defrosting operation, the second defrosting operation stops and the refrigerator stops its operation. That is, the heater stops its operation. If the lower power signal is received while the ice moving unit operates, the operation of the ice moving unit stops. Alternatively, if the lower power signal is received while the ice moving unit stops, the ice moving unit maintains the stop state.

If the save time period ends while the operation of the refrigerator stops, the refrigerator resumes the second defrosting operation. That is, if the save time period ends, the first defrosting operation or the second defrosting operation does not start from the beginning but starts where the second defrosting operation previously stopped.

On the other hand, if the save time period starts while the refrigerator performs the ordinary operation, the operation of the refrigerator stops. That is, the operations of components that are in an on state stop. As an example, the operations of the compressor and the fan motor may stop.

In the embodiments above, the save time period and the delay time period may be collectively referred to as a restriction time period.

On the other hand, if the demand response functionality or the defrosting delay function becomes on and the refrigerator actually performs a restricted operation in response to the demand response functionality or the defrosting delay function, the restricted operation in response to the demand response functionality or the defrosting delay function may not be performed again within a certain time period. For example, in a case where the defrosting operation of the refrigerator is restricted in response to the demand response functionality or the defrosting delay function, the defrosting operation may not be restricted even if the demand response functionality or the defrosting delay function becomes on within 24 hours and the current time matches the start time of the restriction time period. The reason for this is because the cooling performance of the refrigerator may decrease if the defrosting operation is restricted several times within a certain time period.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electrical appliance comprising:
a communicator to receive energy related information from an energy grid;
a controller to receive the energy related information from the communicator;
an energy consumption component operated by the controller; and
an input to receive a command to select an operation mode of the energy consumption component,
wherein the operation mode of the energy consumption component comprises:
a first power saving mode in which the operation of the energy consumption component is restricted on a basis of the energy related information, and
a second power saving mode in which the operation of the energy consumption component is restricted irrespective of the energy related information, and
wherein one of the first and second power saving modes is selected through the input,
wherein the energy related information comprises a restriction time period,
the controller selects one of a delay appliance load mode and a temporary appliance load reduction mode of the appliance on a basis of a length of the restriction time period,
wherein in the delay appliance load mode: the controller stops a defrosting cycle of the appliance in the restriction time period and starts the defrosting cycle again from the beginning of the defrosting cycle after the restriction time period ends;
wherein in the temporary appliance load reduction mode: the controller stops the defrosting cycle of the appliance in the restriction time period and resumes the defrosting cycle from where the defrosting cycle was stopped after the restriction time period ends.

2. The electrical appliance according to claim 1, wherein the input comprises a first selector to select the first power saving mode, and a second selector to select the second power saving mode.

3. The electrical appliance according to claim 2, wherein each of the first and second selector comprises an on button and an off button.

4. The electrical appliance according to claim 1, wherein a display on which the input is displayed or the input displays information on the restriction time period.

5. The electrical appliance according to claim 4, wherein the restriction time period is distinguished from other time period and displayed on the display or the input.

6. The electrical appliance according to claim 1, wherein the controller selects the delay appliance load mode if the length of the restriction time period is equal to or greater than a reference value, and selects the temporary appliance load reduction mode if the length of the restriction time period is less than the reference value.

7. The electrical appliance according to claim 1, wherein the defrosting operation comprises a first defrosting operation and a second defrosting operation that is performed after the completion of the first defrosting operation, and when the delay appliance load mode is selected: if the restriction time period starts in the first defrosting operation, the control unit starts the first defrosting operation from the beginning after the restriction time period ends, wherein in the first defrosting operation, a compressor operates so that before the second defrosting operation, a temperature in the electrical appliance becomes a temperature lower than a set temperature, and in the second defrosting operation, the compressor stops and a heater becomes on.

8. The electrical appliance according to claim 7, wherein the controller performs an operation to cool an inside of a refrigerator in the restriction time period.

9. The electrical appliance according to claim 7, wherein if the restriction time period starts in the second defrosting operation, the control unit starts the first defrosting operation from the beginning.

10. The electrical appliance according to claim 9, wherein if the restriction time period starts in the second defrosting operation, the controller ends the second defrosting operation and performs an operation to cool the inside of a refrigerator.

11. The electrical appliance according to claim 1, wherein the defrosting operation comprises a first defrosting operation and a second defrosting operation that is performed after the completion of the first defrosting operation, and when the temporary appliance load reduction mode is selected: if the restriction time period starts in the first defrosting operation, the controller resumes the first defrosting operation after the restriction time period ends, wherein in the first defrosting operation, a compressor operates so that before the second defrosting operation, a temperature in the electrical appliance becomes a temperature lower than a set temperature, and in the second defrosting operation, the compressor stops and a heater becomes on.

12. The electrical appliance according to claim 1, wherein the defrosting operation comprises a first defrosting operation and a second defrosting operation that is performed after the completion of the first defrosting operation, and when the temporary appliance load reduction mode is selected: if the restriction time period starts in the second defrosting operation, the controller resumes the second defrosting operation after the restriction time period ends, wherein in the first defrosting operation, a compressor operates so that before the second defrosting operation, a temperature in the electrical appliance becomes a temperature lower than a set temperature, and in the second defrosting operation, the compressor stops and a heater becomes on.

* * * * *